United States Patent [19]

Lahoda et al.

[11] Patent Number: 4,676,201
[45] Date of Patent: Jun. 30, 1987

[54] METHOD AND APPARATUS FOR REMOVAL OF RESIDUAL SLUDGE FROM A NUCLEAR STEAM GENERATOR

[75] Inventors: Edward J. Lahoda, Edgewood Boro; David A. Eckhardt, Penn Hills Township, Allegheny County, both of Pa.

[73] Assignee: Westinghouse Electric Corp., Pittsburgh, Pa.

[21] Appl. No.: 634,338

[22] Filed: Jul. 25, 1984

[51] Int. Cl.⁴ .................... F22B 37/52; G21C 19/42
[52] U.S. Cl. .................. 122/392; 122/382; 134/172; 15/316 R; 376/310; 376/316
[58] Field of Search ............... 122/381, 382, 379, 390, 122/392; 15/316 A, 316 R; 134/172, 170; 376/310, 308, 316, 312

[56] References Cited

U.S. PATENT DOCUMENTS

| | | |
|---|---|---|
| 929,198 | 7/1909 | Doble et al. . |
| 1,068,438 | 7/1913 | Magee . |
| 1,101,545 | 6/1914 | Higgins . |
| 1,694,346 | 12/1928 | Radway . |
| 3,563,462 | 2/1971 | Bauer . |
| 3,668,869 | 6/1972 | De Corso et al. . |
| 3,970,249 | 7/1976 | Singer . |
| 4,079,701 | 3/1978 | Hickman et al. ............ 122/382 |
| 4,100,887 | 7/1978 | Malmström et al. .......... 122/390 |
| 4,122,845 | 10/1978 | Stouffer et al. . |
| 4,135,534 | 1/1979 | Antelli ........................ 134/170 |
| 4,276,856 | 7/1981 | Dent et al. . |
| 4,355,949 | 10/1982 | Bailey . |
| 4,424,769 | 1/1984 | Charamathieu et al. . |
| 4,445,465 | 5/1984 | Byrd et al. . |
| 4,566,406 | 1/1986 | Appleman .................. 376/310 X |
| 4,620,881 | 11/1986 | Booij . |

FOREIGN PATENT DOCUMENTS 565110 10/1944 United Kingdom ............... 122/392

Primary Examiner—Deborah L. Kyle
Assistant Examiner—John S. Maples
Attorney, Agent, or Firm—L. A. DePaul

[57] ABSTRACT

A sludge lancing method comprises providing a lancing nozzle and a barrier nozzle for respectively emitting cleaning and barrier streams of fluid along two channels between columns of heat exchange tubes in a nuclear steam generator vessel, the two channels being spaced apart by at least two columns of tubes. The barrier stream prevents dislodged sludge from being moved laterally past it into previously cleaned areas. The streams may be rotated between the center and the periphery of the tube sheet. The barrier nozzle comprises three jets angularly disposed with respect to one another for increased coverage of the barrier channel.

20 Claims, 9 Drawing Figures

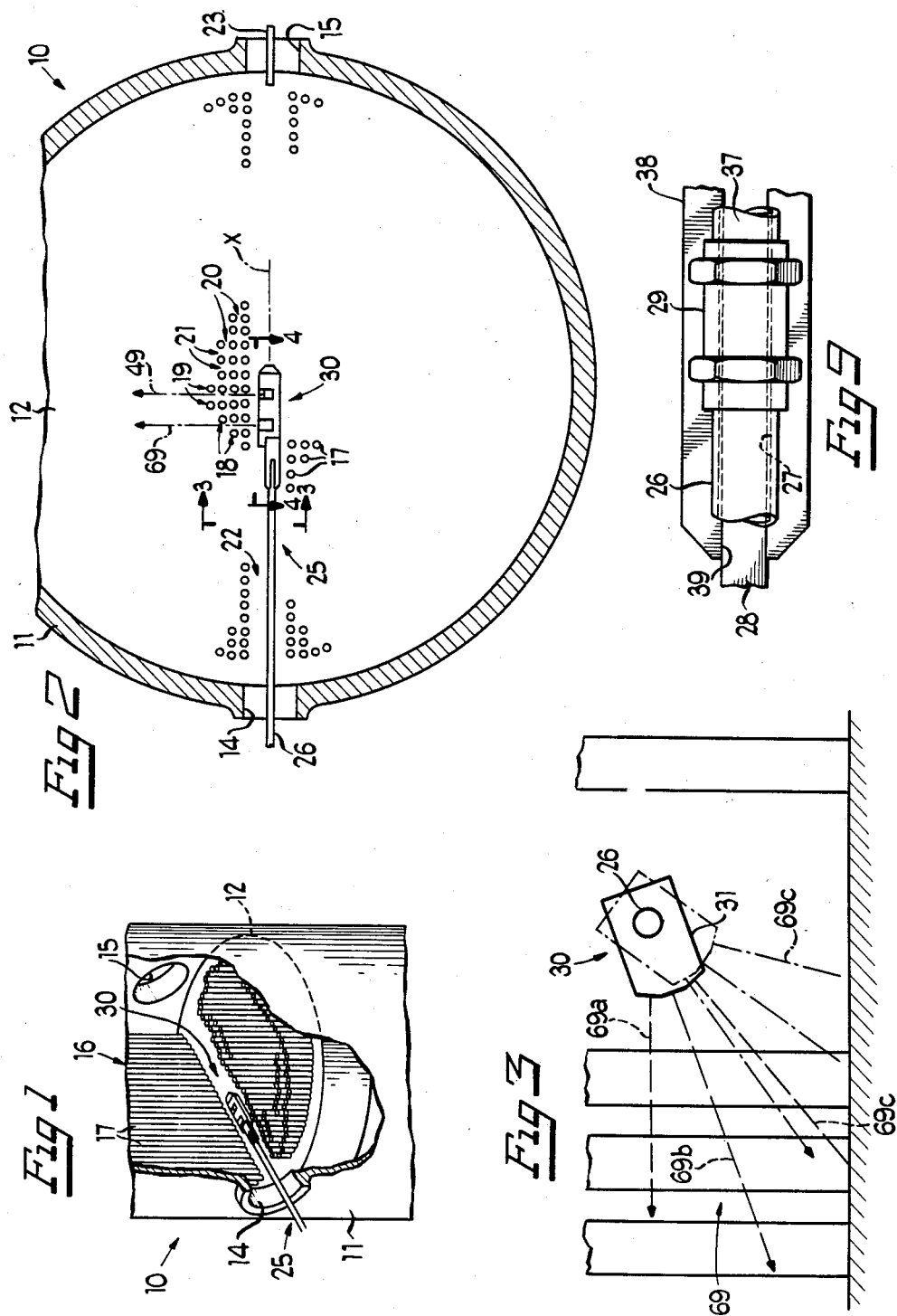

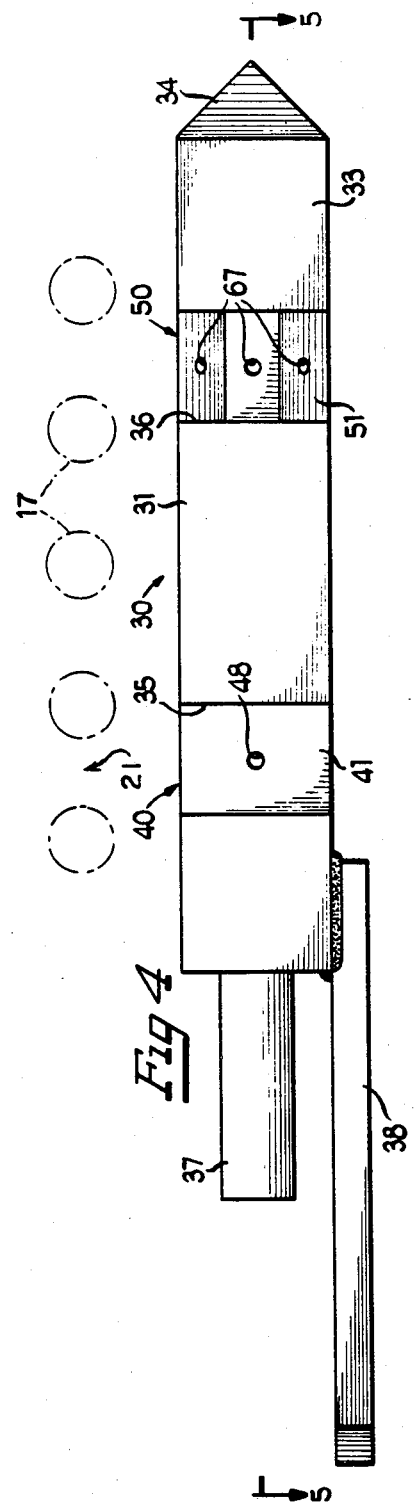
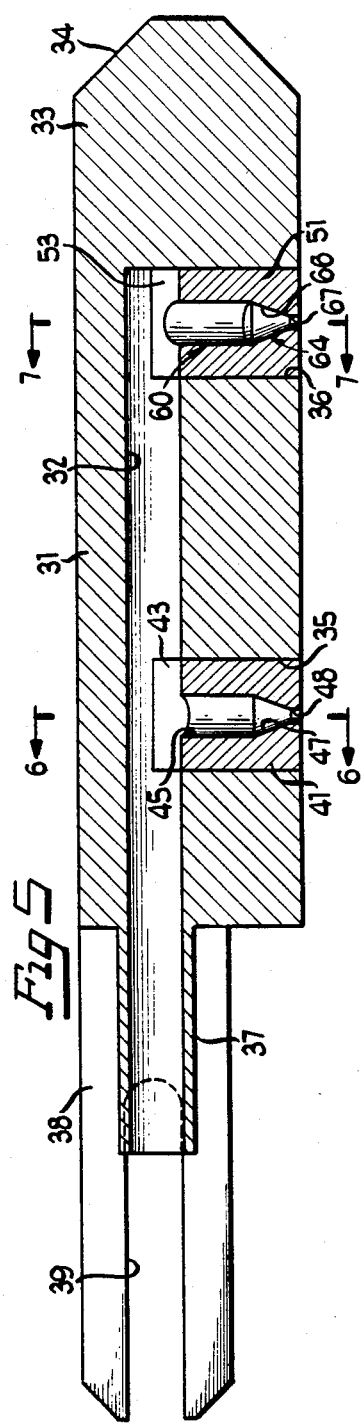

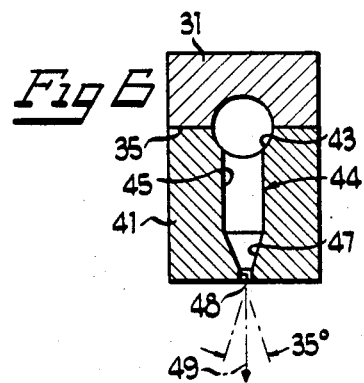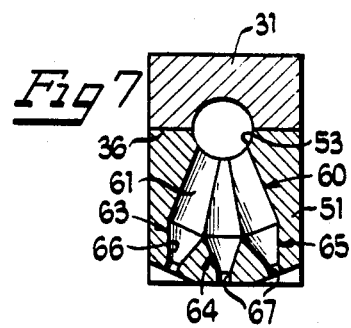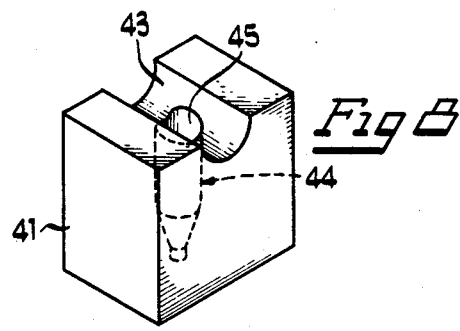

METHOD AND APPARATUS FOR REMOVAL OF RESIDUAL SLUDGE FROM A NUCLEAR STEAM GENERATOR

BACKGROUND OF THE INVENTION

This invention relates to a method and apparatus for sludge lancing suitable for use in removing the sludge deposits on the tube sheet of a nuclear steam generator. The invention has particular application to removal of residual sludge deposits.

A typical nuclear steam generator comprises a vertically oriented shell and a plurality of inverted U-shaped tubes disposed in the shell so as to form a tube bundle. Each tube has a pair of elongated vertical portions interconnected at the upper end by a curved bight portion, so that the vertical portions of each tube straddle a center lane or passage through the tube bundle. The tubes are dimensioned and arranged so that, on each side of the center lane or passage, the vertical tube portions are disposed in an array of parallel rows separated by lanes and parallel columns separated by channels, with the rows and columns extending perpendicular to each other.

A tube sheet supports the vertical portions of the tubes at their lower ends. The vertical tube portions on one side of the center lane are connected to a primary fluid inlet plenum and the those on the other side of the center lane are connected to a primary fluid outlet plenum. The primary fluid, having been heated by circulation through the reactor core, enters the steam generator through the primary fluid inlet plenum, is transmitted through the tube bundle and out the primary fluid outlet plenum. At the same time, a secondary fluid or feedwater is circulated around the tubes above the tube sheet in heat transfer relationship with the outside of the tubes, so that a portion of the feedwater is converted to steam which is then circulated through standard electrical generating equipment.

Sludge, mainly in the form of iron oxides and copper compounds, along with traces of other metals, settle out of the feedwater onto the tube sheet. The sludge deposits provide a site for concentration of phosphate solution or other corrosive agents at the tube walls that results in tube thinning. Accordingly, the sludge must be periodically removed.

One known method for removal of the sludge is referred to as the sludge lance-suction method. Sludge lancing consists of using high pressure water to break up and slurry the sludge in conjunction with suction and filtration equipment that remove the water-sludge mixture for disposal or recirculation. A lance emits a high-velocity water jet or stream substantially perpendicular to the movement of the lance, i.e., parallel to the columns of tubes.

This method works well as long as the sludge height is about one inch or higher on the tube sheet. This is because the higher sludge levels limit the spread of the lancing flow to the channel being processed, and because the leaving of a residual layer one-half to one inch deep is minor if, e.g., six inches of sludge have been removed. However, if the initial sludge depth is one inch or less, a one-half inch layer represents only fifty percent sludge removal. The removal of this residual sludge is difficult due to the tendency of the sludge lance jet to scatter the dislodged sludge particles laterally into already cleaned areas, instead of sending it down the tube channel to the periphery of the tube sheet where the peripheral flow can transport the sludge to the suction pipes for removal.

SUMMARY OF THE INVENTION

It is a general object of the invention to provide an improved sludge lancing method and apparatus for removing residual layers of sludge from steam generators, which avoids the disadvantages of previous methods and apparatuses, while affording additional structural and operating advantages.

An important object of the invention is the provision of a sludge lancing method which effectively prevents scattering of dislodged sludge laterally into already-cleaned areas of the tube sheet.

In connection with the foregoing object, it is another object of the invention to provide a method of the type set forth which is simple and economical and compatible with existing lancing techniques and apparatus.

It is yet another object of the invention to provide apparatus for performing the method.

These and other objects of the invention are attained by providing a method for removing sludge deposits from the tube sheet of a nuclear steam generator vessel to which is connected a bundle of parallel heat exchange tubes arranged in parallel rows separated by lanes and parallel columns separated by channels, the method including the steps of: directing a cleaning stream of fluid along a first channel for dislodging sludge deposits therein and moving them toward the periphery of the bundle of tubes, directing a barrier stream of fluid along a second channel spaced from the first channel by at least two columns of tubes to prevent the dislodged sludge from being moved past the barrier stream into previously cleaned channels, and removing sludge-loaded fluid from the periphery of the bundle of tubes.

The invention consists of certain novel features and a combination of parts and method steps hereinafter fully described, illustrated in the accompanying drawings, and particularly pointed out in the appended claims, it being understood that various changes in the details may be made without departing from the spirit, or sacrificing any of-the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary perspective view of a portion of a nuclear steam generator vessel, with parts broken away to illustrate the lancing method and apparatus of the present invention;

FIG. 2 is an enlarged fragmentary view in horizontal section of the vessel of FIG. 1, illustrating the tube sheet in top plan view;

FIG. 3 is an enlarged diagrammatic view of the lancing apparatus of the present invention, taken generally along the line 3—3 in FIG. 2, and illustrating the fluid streams;

FIG. 4 is a further enlarged side elevational view of the lancing nozzle assembly, taken along the line 4—4 in FIG 2, and illustrating a preferred relationship between nozzle spacing and tube column spacing;

FIG. 5 is a view in horizontal section taken along the line 5—5 in FIG. 4;

FIG. 6 is a view in vertical section taken along the line 6—6 in FIG. 5;

FIG. 7 is a view in vertical section taken along the line 7—7 in FIG. 5;

FIG. 8 is a perspective view of the lancing nozzle block of FIG. 6; and

FIG. 9 is a fragmentary elevational view of the coupling between the lance arm and the nozzle assembly of the present invention.

DESCRIPTION OF THE PREFERRED EMBODIMENT

Referring to FIGS. 1 and 2, there is illustrated a nuclear steam generator vessel, generally designated by the numeral 10, which includes an elongated generally cylindrical wall 11. Extending across and closing the vessel 10 adjacent to the lower end thereof is a circular tube sheet 12. The wall 11 is provided with handholes or inspection ports 14 and 15 at diametrically opposed locations thereon a slight distance above the level of the tube sheet 12. Mounted on the tube sheet 12 is a tube bundle, generally designated by the numeral 16. The tube bundle 16 includes a plurality of heat transfer tubes 17 which may number about 7,000, and each of which is generally in the shape of an inverted U. The vertical portions of the tubes 17 are arranged in an array of parallel rows 18 and columns 19, the rows 18 being separated by inter-row lanes 20 and the columns 19 being separated by inter-column channels 21. The vertical portions of each tube 17 straddle a relatively wide center tube lane 22 extending diametrically across the tube sheet 12 in alignment with the handholes 14 and 15. Preferably, a suction header 23 is disposed in the handhole 15, and a peripheral flow injection header (not shown) is provided for flowing cleaning fluid and entrained sludge particles along the perimeter of the tube sheet 12 for discharge through the suction header 23 in a known manner.

There is mounted on the nuclear steam generator vessel 10 a fluid lance, generally designated by the numeral 25, for the purpose of removing sludge which builds up on the tube sheet 12 between the rows and columns of tubes 17. The fluid lance 25 is mounted on the wall 11 adjacent to the handhole 14 by a suitable mounting structure (not shown), which may be substantially like that disclosed in U.S. Pat. No. 4,273,076. The disclosure of that patent is incorporated herein by reference, so that only so much of the structure of the fluid lance 25 as is necessary for an understanding of the present invention will be described in detail herein.

The fluid lance 25 includes an elongated tubular arm 26, which is extended through the handhole 14 coaxially therewith, substantially radially of the tube sheet 12 along the center tube lane 22. The arm 26 has a cylindrical bore 27 extending longitudinally therethrough for carrying the lancing fluid in a known manner. Preferably, the lance 25 is arranged so that the arm 26 may be rotated about its longitudinal axis, also in a known manner. The arm 26 may be provided with a rack 28 (FIG. 9) extending longitudinally thereof for cooperation with a pinion gear (not shown) in the mounting structure for extending and retracting the arm 26.

Referring now also to FIGS. 3–9 of the drawings, there is fixedly secured to the arm 26 at its distal end, as by a coupling 29, a nozzle assembly 30. The nozzle assembly 30 includes an elongated manifold 31, rectangular in transverse cross section, and having a cylindrical bore 32 extending longitudinally thereinto from one end thereof and terminating a slight distance from the other closed end 33 thereof. The outer surface of the closed end 33 may be tapered, as at 34, to generally prismatic shape. Formed in the manifold 31 and communicating with the axial bore 32 are two rectangular notches or recesses 35 and 36, spaced apart a predetermined distance longitudinally of the manifold 31.

Integral with the open end of the manifold 31 and projecting therefrom coaxially with the bore 32 is a tubular extension 37, the inner diameter of which is substantially equal to that of the bore 32 and that of the bore 27 in the lance arm 26. The extension 37 is received in the coupling 29 so that the bores 27 and 32 are coaxial, thereby to couple the open end of the manifold 31 to the distal end of the lance arm 26. Also fixedly secured to the manifold 31 adjacent to the open end thereof and projecting therefrom parallel to the extension 37 is an elongated locating arm 38 provided with an elongated slot 39 extending longitudinally thereinto from the distal end thereof. In use, the slot 39 is adapted to receive the adjacent end of the rack 28 on the lance arm 26, accurately to orient the manifold 31 with respect to the arm 26.

Carried by the manifold 31 are a lance nozzle 40 and a barrier nozzle 50, respectively comprising nozzle blocks 41 and 51 which are respectively receivable in the notches 35 and 36 of the manifold 31. More particularly, the nozzle blocks 41 and 51 are shaped and dimensioned to be snugly fitted in the notches 35 and 36 so that the outer surfaces of the nozzle blocks 41 and 51 are substantially flush with the outer surfaces of the manifold 31. The nozzle blocks 41 and 51 may be secured in place by weldments.

Referring more particularly to the lance nozzle 40, the nozzle block 41 is provided in the inner end thereof with an arcuate recess 43 extending the width thereof for closing and completing the portion of the manifold bore 32 which is intersected by the notch 35. Also formed in the nozzle block 41 and extending laterally thereinto and communicating with the recess 43 and the manifold bore 32 perpendicular thereto is a cylindrical channel 44. More specifically, the channel 44 has a main bore 45 having a diameter less than that of the recess 43, the outer end of the main bore 45 communicating by way of a frustoconical portion 47 with a small-diameter outlet portion 48. In use, cleaning fluid, which may be water, flows through the lance arm 26 and the manifold bore 32 and exits through the channel 44 and the outlet portion 48 thereof in a narrow, highpressure cleaning jet or stream 49 (see FIGS. 2 and 6).

Similarly, the nozzle block 51 is provided with an arcuate recess 53 at its inner end extending across the width thereof and dimensioned and positioned for closing and completing the portion of the manifold bore 32 intersected by the notch 36. Also formed in the nozzle block 51 and extending laterally thereinto and communicating with the arcuate recess 53 and the manifold bore 32 substantially perpendicular thereto is a cylindrical channel 60. The channel 60 includes an outwardly diverging, fan-shaped plenum 61 with a circular inner end having a diameter less than that of the arcuate recess 53. Communicating with the outer end of the plenum 61 are three outlets 63, 64 and 65, each including an outwardly converging frustoconical portion 66 and a small-diameter cylindrical outlet portion 67. The three outlets 63–65 respectively emit high-pressure jets 69a, 69b and 69c which cooperate to form a barrier stream 69 (see FIGS. 2 and 3). Preferably, the outlet 64 is disposed with the axis thereof extending radially of the manifold bore 32, while the outlets 63 and 65 have axes which intersect the axis of the outlet 64, respectively about 20° thereabove and therebelow.

Referring in particular to FIGS. 2 and 3, the lancing method of the present invention utilizing the lance 25 and the nozzle assembly 30 will now be described. The lance 25 is inserted into the steam generator vessel 10 through the handhole 14 a predetermined distance above the tube sheet 12, which distance will vary depending upon the design of the steam generator vessel 10, between a few inches and about three feet. The lance 25 is inserted into the center lane 22, with the nozzle assembly 30 oriented so that the cleaning and barrier streams 49 and 69 will be directed toward one side thereof. Cleaning fluid such as water is introduced into the lance 25, which discharges the water through the nozzles 40 and 50 perpendicular to the center lane 22.

The lancing operation begins with the cleaning stream 49 directed into the first channel 21 between the first two columns 19 of tubes 17. The lance 25 is then advanced or indexed radially inwardly of the tube sheet 12, one channel at a time, until one half of one side of the steam generator vessel 10 has been lanced. More specifically, the lance 25 is preferably advanced until the cleaning stream 49 has been moved two channels past the center of the tube sheet 12, so that the barrier stream 69 is substantially at the center of the tube sheet 12.

In positioning the nozzles 40 and 50 on the manifold 31, it is necessary that the nozzles 40 and 50 not be too close together or too far apart. If they are too close together, the particles of dislodged sludge scattered from the channel 21 being cleaned may have too great a velocity to have their direction changed and blocked by the barrier stream 69. If the nozzles 40 and 50 are too far apart, the dislodged sludge particles may settle out on the tube sheet 12 before reaching the barrier stream 69, in which case the barrier stream 69 will then operate like a second cleaning stream.

The optimum spacing between the cleaning stream 49 and the barrier stream 69 will vary depending upon the system parameters and the design of the nuclear steam generator vessel 10. The spacing may be in the range of between 2 and 20 tube pitches, but is typically 2 or 3 tube pitches (wherein a tube pitch is the center-to-center distance between adjacent tube columns 19). However, in the preferred embodiment, it has been found that the optimum spacing is three tube pitches i.e., with two empty channels 21 between the cleaning and barrier streams 49 and 69. The barrier stream 69 serves to establish a barrier to block the lateral scattering of sludge particles dislodged by the lancing or cleaning stream 49, so that they are not scattered back into already-cleaned portions of the tube sheet 12.

It will be appreciated that the lance arm 26 is rotatable about its longitudinal axis "X" (FIG. 2), for effecting a simultaneous rotation of the nozzle assembly 30. Such rotation may be utilized when the lance 25 is disposed more than ten inches above the tube sheet 12, so as to insure complete coverage of the tube channels 21. More specifically, the most effective cleaning operation is achieved at the point where the cleaning jet or stream 49 strikes the sludge layer on the tube sheet 12. Thus, in order to effectively dislodge sludge along the entire length of the channel 21, particularly in channels near the center of the tube sheet 12, it is necessary to sweep the cleaning stream 49 radially outwardly from the side edge of the center lane 22 toward the periphery of the tube sheet 12. Preferably, the rotation of the lance arm 26 is controlled so that this sweeping action stops when the cleaning stream 49 strikes the tube sheet 12 about eight inches from the periphery thereof. It is not desirable that the cleaning stream 49 be moved any closer to the periphery of the tube sheet 12, since in that case it might block the flushing or evacuation flow around the periphery toward the suction header 23. Preferably, the rotation of the lance arm 26 from the center of the tube sheet 12 toward the periphery thereof is at a rate of approximately 3° per second. It will be appreciated that the lance nozzle 40 and the barrier nozzle 50 are both rotated simultaneously on the lance arm 26 so that the barrier stream 69 is being swept radially outwardly at the same rate as is the cleaning stream 49.

The barrier nozzle 50 could be provided with any number of outlet jets, but three outlet jets have been found to provide optimum performance. As can best be seen in FIG. 3, the three jets 69a–c serve to provide a fan-like barrier stream 69 which strikes the tube sheet 12 along a substantial length of the tube channel 21, thereby to insure that an effective barrier will be formed laterally opposite as well as slightly ahead of and slightly behind the cleaning stream 49. It is also possible to utilize a slot-shaped outlet for the barrier nozzle 50 in lieu of three discrete outlets 63–65, but it has been found that the three discrete outlets 63–65 provide better results. It would also be possible to use more than three jets to comprise the barrier stream 69. But the more jets that are used the greater will be the water flow, and it is necessary to minimize the total water depth on the tube sheet 12 to less than four inches. Therefore, it is desirable to minimize the number of outlets in the barrier nozzle 50, and it has been found that the use of, for example, five jets does not provide significantly improved performance as compared with three jets.

In this regard, it has been found that for cleaning effectiveness the flow rate from the nozzles 40 and 50 is more significant than the water velocity. Depending upon the design of the steam generator vessel 10 and the particular nozzle configurations, the flow rate from each of the nozzles 40 and 50 may be in the range from about 5 gallons per minute to about 30 gallons per minute. However, for the preferred embodiment disclosed herein, an optimum total flow rate from both nozzles has been found to be about 12.0 gallons per minute, +5.0 gallons or −0.5 gallons per minute.

In the preferred embodiment each of the nozzle channels 44 and 60 has a total length of at least 0.65 inch and preferably about 1 inch to insure proper collimation of the cleaning and barrier streams 49 and 69. The recesses 43 and 53 have approximately a $\frac{3}{8}$ inch diameter, the main bore 45 of the channel 44 has a diameter of about $\frac{1}{4}$ inch, and the diameters of the outlet portions 48 and 67 are, respectively, about 0.125 inch and about 0.094 inch. The walls of the frustoconical portions 47 and 66 taper at an angle of about 35°.

When the cleaning and barrier streams 49 and 69 have been swept outwardly to their radially outermost portions near the peripheral ends of the channels 21, the lance arm 26 is rotated back toward the center lane 22 as rapidly as possible, and the lance 25 is then indexed to the next channel 21. Preferably, during this indexing, the water flow from the nozzles 40 and 50 is interrupted. This may be accomplished by shutting off the flow of water along the lance 25, by rotating the lance arm 26 so that the nozzles 40 and 50 are aimed straight up or straight down, by introducing blocking elements for blocking the flow, or other suitable means. The purpose of this interruption is to prevent the cleaning and barrier streams 49 and 69 from impinging directly on the tubes 17 in the first row 18 thereof, and possibly damaging them, and also to insure that the cleaning of the next channel 21 will not be started until the barrier stream 69 has been established.

When the lance 25 has been advanced to the point where the barrier nozzle 50 is at the center of the tube sheet 12, the method can be continued until the opposite side of the tube sheet 12 is reached, if the lance arm 26 is of sufficient length. Alternatively, the lance 25 may be moved to the opposite handhole 15 and the method may continue by advancing the lance arm 26 from the center of the tube sheet 12 to the periphery thereof at the handhole 15. In this regard, it will be appreciated that the suction header 23 and the associated peripheral flow inspection header will be switched to opposite ends of the center tube lane 22. The nozzle assembly 30 will be rearranged on the lance arm 26 so that the barrier nozzle 50 follows the lance nozzle 40. Two sets of nozzle assemblies 30 may be provided for this purpose. Also, two complete lances 25 could be provided, so that the lance 25 does not have to be moved.

When one-half of the tube sheet 12 has been cleaned, the method is repeated with the nozzle assembly 30 directed toward the other half of the tube sheet 12. Alternatively, there could be provided lance nozzles 40 and 50 with dual outlets to simultaneously direct cleaning and barrier streams 49 and 69 in both directions from the center lane 22 to simultaneously clean both halves of the tube sheet 12. It will also be appreciated that, if desired, more than one lance nozzle 40 could be provided for simultaneously cleaning adjacent channels 21.

While the preferred embodiment of the invention utilizes a rotating lance arm 26, for use in steam generators where the handholes 14 and 15 are at least 10 inches above the tube sheet 12, it will be appreciated that the method of the present invention could also be applied to other steam generators. However, when the handholes 14 and 15 are located less than 10 inches above the tube sheet 12, the lance arm 26 would not be rotated, but rather, the cleaning and barrier streams 49 and 69 would be arranged with very shallow angles with respect to the tube sheet 12, and the velocities thereof would be increased to provide the necessary cleaning action.

It is a significant aspect of the present invention that it can be used with either "square" or "triangular" pitch tube arrays and requires minimal modification of existing lance equipment. It will also be appreciated that, if necessary, more than one pass could be made over the same area of the tube sheet 12 to insure maximum sludge removal. In this regard, it has been found that with the present invention, greater than 95% of the residual sludge can be removed per pass.

From the foregoing, it can be seen that there has been provided an improved apparatus and method for cleaning residual sludge from the tube sheet of a nuclear steam generator vessel, characterized by prevention of backscatter of dislodged sludge particles over previously-cleaned areas of the tube sheet, thereby maximizing the sludge removal effectiveness of the system.

We claim:

1. A method for removing sludge deposits from the tube sheet of a nuclear steam generator vessel to which is connected a bundle of parallel heat exchange tubes arranged in parallel rows separated by lanes and parallel columns separated by channels, said method including the steps of: directing a cleaning stream of sequentially advancing a lance past the channels one channel at a time, fluid along a first channel for dislodging sludge deposits therein and moving them toward the periphery of the bundle of tubes, substantially simultaneously directing a barrier stream of fluid from the lance in substantially the same direction as said cleaning stream along a second channel spaced from said first channel by at least two columns of tubes with no streams being directed from the lance along any other channel between said first and second channels to prevent the dislodged sludge from being moved past said barrier stream into previously cleaned channels, each of said streams having an axis immovable with respect to the other stream in directions parallel to the tube sheet and having a width in directions perpendicular to said axis and parallel to the tube sheet less than the width of the associated channel along which said stream is directed, and removing sludge-loaded fluid from the periphery of the bundle of tubes.

2. The method of claim 1, wherein said second channel is spaced from said first channel by between two and twenty columns of tubes.

3. The method of claim 1, wherein said second channel is spaced from said first channel by three columns of tubes.

4. The method of claim 1, wherein said fluid removing step includes the steps of withdrawing fluid from a predetermined location at the periphery of the tube sheet, and establishing a peripheral flow of fluid around the periphery of the tube sheet directed toward said predetermined location for moving cleaning fluid and entrained sludge particles from the channels to the discharge location.

5. The method of claim 1, wherein said cleaning stream is interrupted during movement thereof from one channel to the next.

6. The method of claim 1, and further including the step of rotating said streams about an axis parallel to the tube sheet and perpendicular to said channels for varying the distances from said axis at which the streams strike the tube sheet.

7. The method of claim 6, wherein said streams are rotated at a relatively slow rate when being moved from said axis toward the periphery of the tube bundle and are rotated at a relatively rapid rate when being moved from the periphery of the tube bundle back toward said axis.

8. A method for removing sludge deposits from the tube sheet of a nuclear steam generator vessel to which is connected a bundle of parallel heat exchange tubes arranged in parallel rows separated by lanes and parallel columns separated by channels, said method including the steps of: sequentially advancing a lance past the channels one channel at a time, directing from a discharge point a predetermined distance above the tube sheet a cleaning stream of fluid from the lance along a first channel for dislodging sludge deposits therein and moving them toward the periphery of the bundle of tubes, substantially simultaneously directing a barrier stream of fluid from the lance in substantially the same direction as said cleaning stream along a second channel spaced from said first channel by at least two columns of tubes with no streams being directed from the lance along any other channel between said first and second channels to prevent the dislodged sludge from being moved past said barrier stream into previously cleaned channels, each of said streams having an axis immovable with respect to the other stream in directions parallel to the tube sheet and having a width in directions perpendicular to said axis and parallel to the tube sheet less than the width of the associated channel along which said stream is directed, said barrier stream comprising a plurality of jets respectively directed at successively smaller angles with respect to the plane of the tube sheet so as to strike the tube sheet at successively greater distances from the discharge point to provide a relatively long barrier along said second channel, and removing sludge-loaded fluid from the periphery of the bundle of tubes.

9. The method of claim 8, and further including the step of interrupting said cleaning stream during movement thereof from one channel to the next.

10. The method of claim 8, wherein said barrier stream comprises three jets of fluid.

11. The method of claim 10, wherein the center one of said jets is disposed an an angle of substantially 20° with respect to each of the other two jets.

12. The method of claim 8, and further including the step of rotating said cleaning stream about an axis disposed parallel to the tube sheet and perpendicular to said channels for varying the distance from said axis at which said cleaning stream strikes the tube sheet.

13. The method of claim 12, wherein said barrier stream is rotated about said axis simultaneously with the rotation of said cleaning stream.

14. In a system for removing sludge deposits from the tube sheet of a nuclear steam generator vessel to which is connected a bundle of parallel heat exchange tubes arranged in parallel rows separated by lanes and parallel columns separated by channels, including a lance insertable along a lane and having a first nozzle for directing a cleaning stream of fluid along a first channel for dislodging sludge deposits therein and moving them toward the periphery of the tube sheet and means at the periphery of the tube sheet for collecting and evacuating sludge-loaded fluid, the improvement comprising: a second nozzle carried by the lance and positioned for directing a barrier stream of fluid substantially simultaneously with and in substantially the same direction as said cleaning stream along a second channel spaced from the first channel by at least two columns of tubes with no streams being directed from the lance along any other channel between said first and second channels to prevent the dislodged sludge from being moved past said barrier stream into previously cleaned channels, said barrier stream having an axis and having a width in directions perpendicular to said axis and parallel to the tube sheet less than the width of the associated channel along which said barrier stream is directed, and means for sequentially advancing the lance past the channels one channel at a time.

15. The system of claim 14, wherein said second nozzle is fixedly secured to the lance.

16. The system of claim 14, wherein said second nozzle is positioned so that said second channel is spaced from said first channel by three columns of tubes.

17. The system of claim 14, wherein said second nozzle includes a plurality of discharge apertures angularly disposed with respect to each other for respectively emitting a plurality of jets of fluid which cooperate to form said barrier stream.

18. The system of claim 17, wherein said second nozzle includes three discharge apertures.

19. The system of claim 14, and further including a hollow manifold member to which each of said first and second nozzles is fixedly secured for communication therewith.

20. The system of claim 19, wherein said manifold member is removably mounted on the lance.

* * * * *